Dec. 24, 1968   T. J. McRAE   3,417,833
APPARATUS FOR PUSHING VEHICLES
Original Filed July 12, 1965   4 Sheets-Sheet 1

INVENTOR.
THOMAS J. McRAE
BY Albert L. Jeffers
ATTORNEY

Dec. 24, 1968  T. J. McRAE  3,417,833
APPARATUS FOR PUSHING VEHICLES
Original Filed July 12, 1965  4 Sheets-Sheet 2
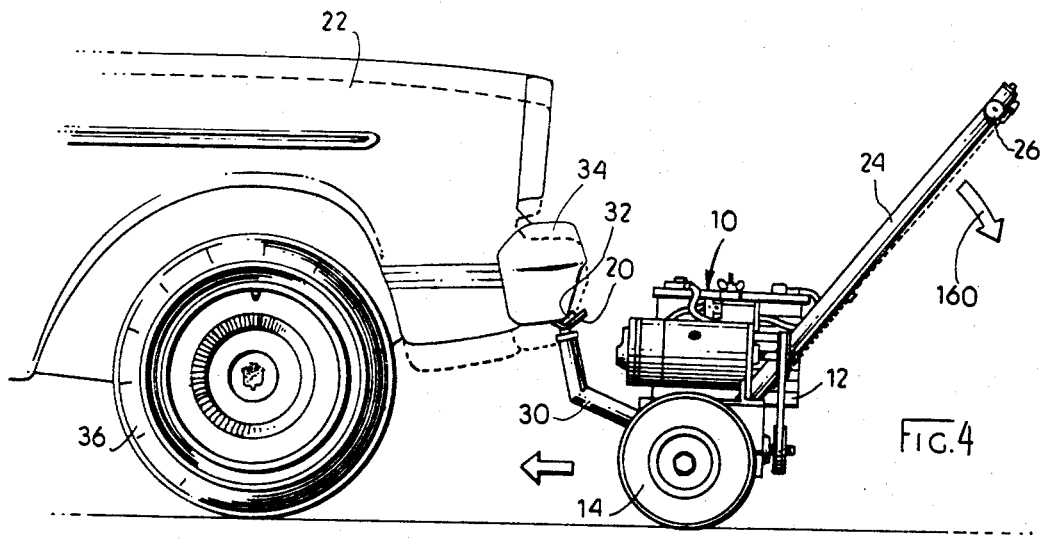
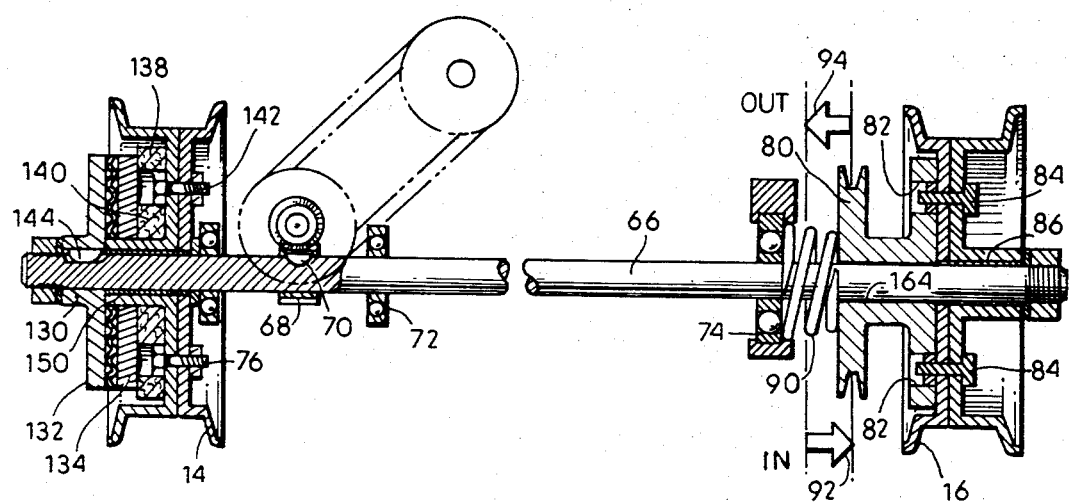
INVENTOR.
THOMAS J. McRAE
BY *Albert L. Jeffers*
ATTORNEY

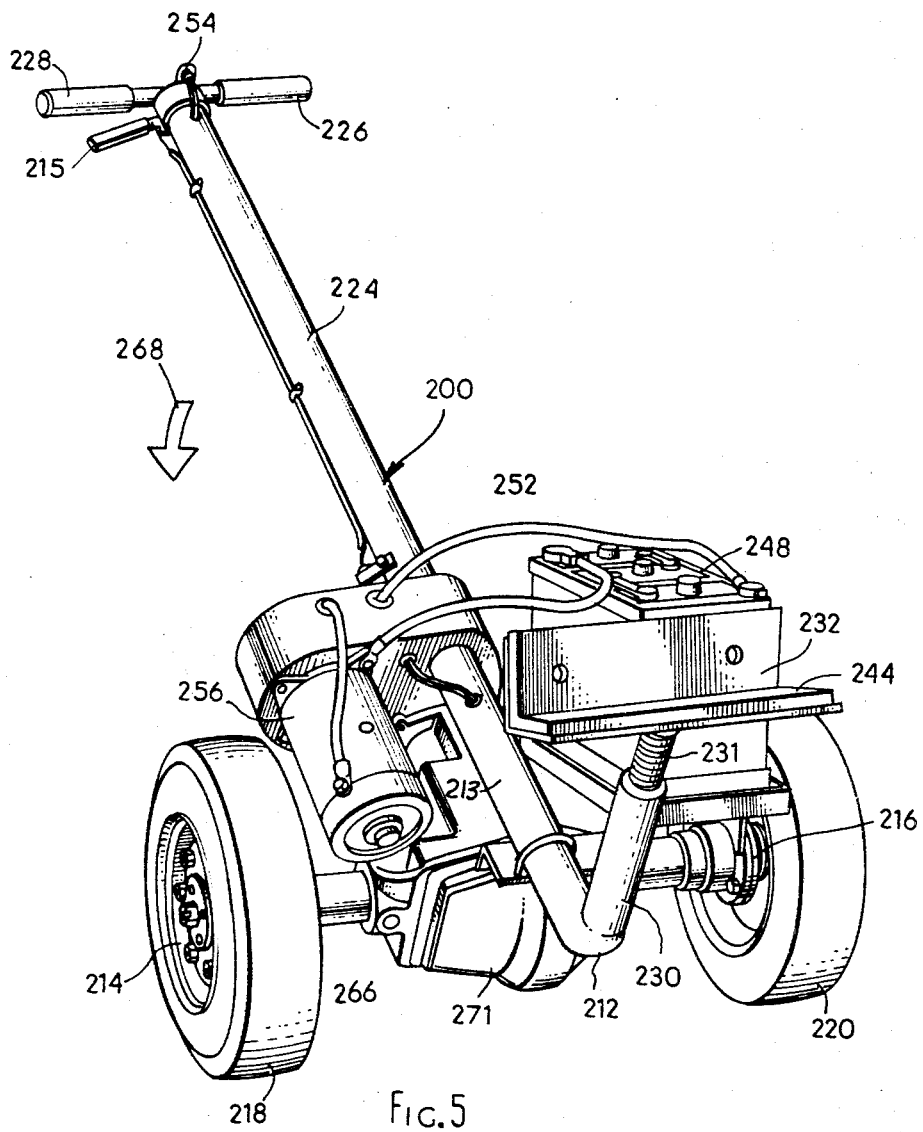

Dec. 24, 1968    T. J. McRAE    3,417,833
APPARATUS FOR PUSHING VEHICLES
Original Filed July 12, 1965    4 Sheets-Sheet 4

INVENTOR
THOMAS J. McRAE
by Albert L. Jeffers
Attorney

United States Patent Office 3,417,833
Patented Dec. 24, 1968

3,417,833
APPARATUS FOR PUSHING VEHICLES
Thomas J. McRae, 3511 Owaissa Way,
Fort Wayne, Ind. 46807
Continuation of application Ser. No. 473,905, July 12, 1965, which is a continuation-in-part of application Ser. No. 282,661, May 23, 1963. This application Sept. 28, 1966, Ser. No. 583,126
8 Claims. (Cl. 180—19)

ABSTRACT OF THE DISCLOSURE

A two-wheel vehicle for pushing automobiles or the like which has an axle mounted between the two wheels to form an axis about which the carriage will pivot. A battery is carried by the vehicle to furnish power to an electric motor which drives one or more wheels through a gear transmission. A lifting arm having a portion which is V-shaped in cross section with a rubber bumper disposed thereon, extends at an angle of less than 90° with respect to the horizontal from the vehicle to effect a lifting force on the object to be moved and transfers weight onto the ground engaging wheels.

---

This application is a continuation of U.S. application No. 473,905 filed July 12, 1965, which is a continuation-in-part of my earlier filed application of the same title and filed May 23, 1963, Ser. No. 282,661, and now abandoned.

This invention relates to an apparatus for pushing vehicles and more particularly it relates to a small compact carriage which can be operated by a single operator and is capable of lifting at least a part of the weight of the vehicle and thereafter transporting the vehicle to a selected storage location.

In many parking lots, garages, repair depots, and other places, vehicles must on occasion be moved about by some auxiliary means because the vehicle is immobilized from mechanical failure. Since it can take as many as four or five men to push vehicles which are immobile, it is proposed by means of the present invention to transport a disabled vehicle by a power actuated device which can be operated by single individuals and without substantial manual effort. A second person can be used to steer the disabled vehicle while it is being moved by said power actuated device. It becomes unnecessary to require substantial numbers of people to push a disabled vehicle and therefore it is possible to economically handle substantial numbers of cars with fewer persons and also to reduce the possibility of injury to individuals by over-exertion from hand pushing cars or other vehicles from one place to another.

Accordingly, one of the principal objects of the present invention is to provide a compact, inexpensive power actuated device which can easily be operated by a single operator to provide motive force for moving disabled vehicles from one location to the other.

A further object of the present invention is to provide a simple, inexpensive carriage which is readily actuated and deactuated and is capable of readily moving a vehicle with minimum manual effort.

A still further object of the present invention is to provide a simple but effective control means for actuating and deactuating a power source and which thereafter provides the force adapted to move a disabled vehicle from one place to another.

A still further object of the present invention is to provide a novel lifting mechanism by which the vehicle can be raised and its weight transposed onto the wheels of a carriage and which is securely coupled to the carriage to impart motive force on the vehicle through the wheels of the carriage which are power actuated as determined by the operator.

Other objects and features of the invention will become apparent from a consideration of the following description, which proceeds with reference to the accompanying drawings, wherein:

FIGURE 2 is a sectional view of the assembled slip clutch and wheel at one side of the push vehicle;

FIGURE 3 is a sectional view of the clutch and wheel at the opposite side of the push vehicle;

FIGURE 4 shows the push vehicle in towing relation with a disabled vehicle, the dotted lines indicating the initial position of the bumper and car body and the raised position of the vehicle illustrated in full lines;

FIGURE 5 is an isometric view of a still further embodiment of the invention; and, FIGURE 6 is an enlarged isometric view of a drive mechanism and electrical system for controlling the drive mechanism.

Figure 1:
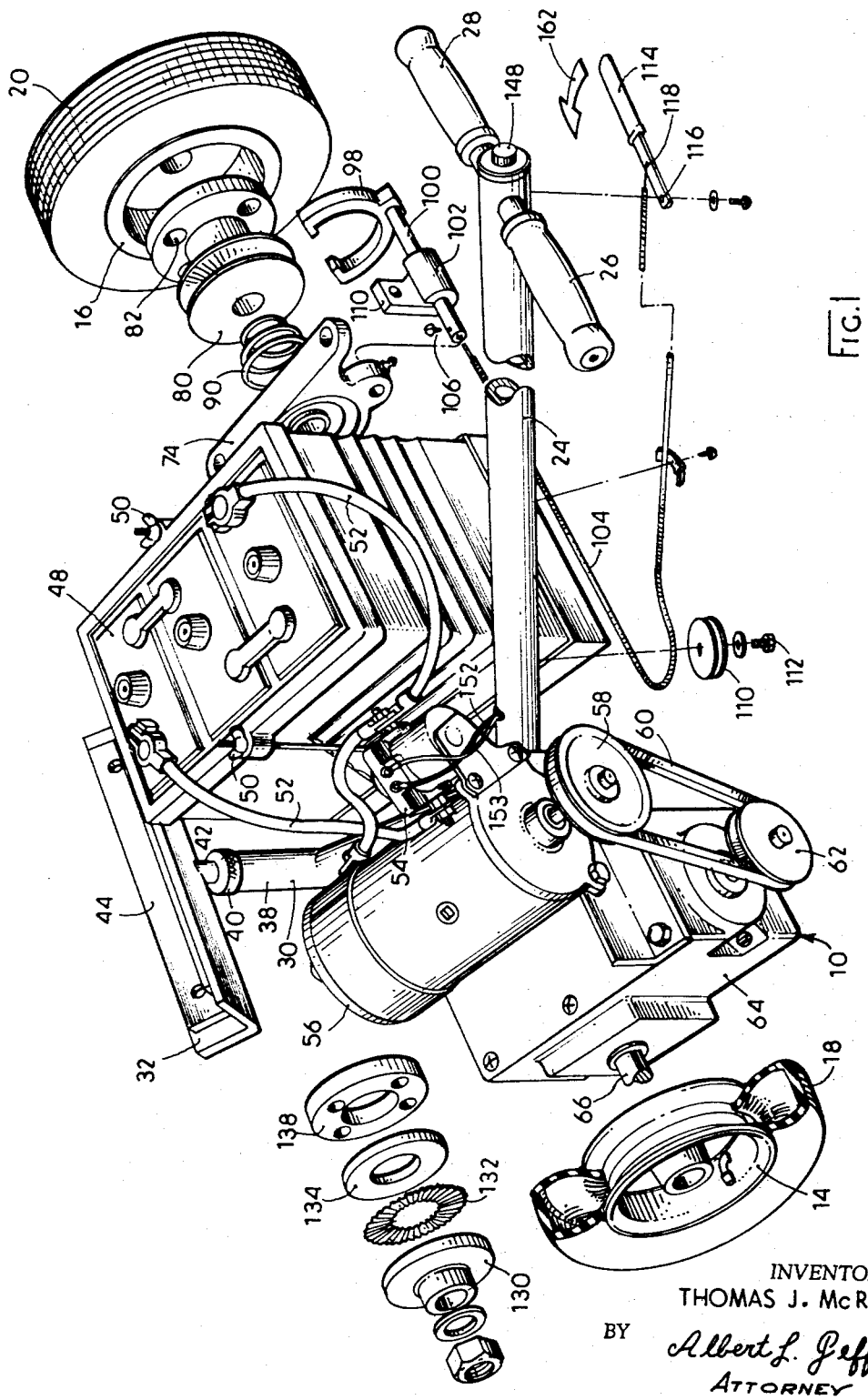
FIGURE 1 illustrates an isometric view of the power mechanism for the push vehicle, the clutch mechanism being shown in exploded view.

Referring now to the drawings, the push vehicle, designated generally by reference numeral 10 includes a carriage 12 which is supported on two wheels 14 and 16 having floor or ground-engaging tires 18 and 20, the axis of rotation of the wheels also serving as an axis of rotation about which the carriage is turned to raise a disabled, stalled or non self-propelled vehicle 22.

The carriage is caused to turn or pivot about the axis of rotation of the wheels by means of a handle 24 having grip bars 26, 28 so that when the handle 24 is pushed down, a lift arm 30 which has a V-shaped cross section lifting surface 32 in engagement with the bumper 34 of the vehicle 22, will raise the body and the fender of the vehicle 22 from the dotted line position to the full line position and transfers a substantial part of the weight of the vehicle from the vehicle wheels 36 to the wheels 14, 16 of the push vehicle 10. The lift arm 30 (FIGURE 1) includes a frame 38 and bearing 40 with a shaft 42 for supporting the V-bar lifting surface 32. The V-bar lifting surface 32 can include a rubber bumper or protector 44 to prevent damage to the bumper while it is being raised.

When the weight of the vehicle is transferred onto the wheels 14, 16 of the push vehicle 10, it is possible for the push vehicle 10 to move a non self-propelled car from one location to the other thereby avoiding the generation of noxious exhaust fumes within closed spaces such as garages and the like. Therefore, the invention has particular application in large garages where it is necessary to transport substantial numbers of vehicles but without polluting the atmosphere. It is also possible to transport substantial numbers of vehicles which may be locked or disabled for some reason or another and must therefore be translated by means other than under their own power.

The wheels 14 and 16 are driven by a battery 48 which is secured to the carriage by means of hold-down clamps 50. The battery is connected by cables 52 to a motor solenoid relay switch 54 which energizes an electric drive motor 56. The drive motor is adapted to turn a pulley 58 having a V-belt 60 and is connected with a second pulley 62 operatively connected with a gear reduction box 64. The gear reduction box communicates driving force to a drive shaft 66 through a driven gear 68 and Woodruff key 70, the drive shaft being rotatably journaled on the carriage by spaced bearing 72, 74 and 76. The spring washer 132 mounted between hub 130 and clutch plate 138 serves as a friction clutch whereby driving force is communicated or severed from the drive motor 56 to the wheel 14. The dog clutch 80 is maintained normally engaged by the urging of spring 90. The dog clutch 80 is provided with openings 82 adapted to register with the dogs 84 on wheel 16 (FIGURE 3) to provide a driving connection between the shaft 66 which is splined at 164 with the dog clutch 80 to transfer driving force to the wheel 16 as shown in FIGURE 3.

When the dog clutch 80 is disengaged, the shaft 66 rotates within bushing 86 and does not produce rotation of the wheel 16. The dog clutch 80 is urged to the right, that is, in clutch-engaging position by a clutch spring 90 which bears at one end against the drive axial bearing 74 and at the other end against the dog clutch, urging it to "in" position indicated by the arrows 92. The dog clutch 80 is held in an "out" position as indicated by the arrow 94 by means of a dog clutch fork 98 having a rod 100 slidably movable through a retaining bracket 102 with a mounting lug 110 which is fastened in some suitable manner to the carriage.

The clutch fork 98 may be moved to the left by a clutch control cable 104 which is spliced to the rod by a screw 106 and is passed over an idler pulley 110 mounted by a screw 112 which screws into the handle 24 and is hooked to the clutch handle 114. The clutch handle is fulcrumed at 116 and the cable attaches to the handle at 118 so that when the clutch handle 114 which is conveniently accessible at the grips 26, 28 is pulled in one direction, the clutch fork 98 is moved to its disengaged position, that is, in the direction urging the dog clutch 80 in the "out" direction indicated by 94 in FIGURE 3. This described actuation disengages the dog clutch.

A half-moon key 144 forms a drivable connection between the shaft 66 and the hub and plate 130 so that the hub and plate is at all times rotatably driven by the drive shaft 66.

The clutch plate 138 is engaged with the dogs 142 at all times whereby the clutch plate 138 will provide a smooth surface for the plate 134. This friction clutch means serves as a slip clutch so that power is transferred to the wheel 14 when the drive motor 56 is energized.

The operator also has available to him an electric operating switch 148 which, acting through conductors 152, 153 operates the motor solenoid relay switch 54 to actuate or deactuate the electric drive motor 56.

In operation, the carriage 10 is wheeled into position in relation to the disabled or otherwise immobile vehicle 22 and is tilted about its wheels 14, 16 so that the arm 30 and V-shaped lift bar 32 are beneath the rear bumper 34. The handle 24 is then rotated manually in the direction of the arrow 160, raising the bumper 34 and body from the dotted line position to the full line position (FIGURE 4) so that at least a part of the vehicle weight is transferred then from the wheels 36 to the carriage wheels 14, 16. At this time, the clutch is normally engaged so that the wheels 14 and 16 of the carriage are operative.

The drive motor 56 is then energized, (typically a six volt electric drive motor) by depressing the switch 148 at which time the motor is actuated by battery 48 and the drive shaft 66 is caused to rotate through the gear reduction box 64. To disengage the clutch 80 the handle 114 is moved in the direction opposite to the arrow 162 (FIGURE 1) which will operate the work 98 through the cable 104 to move the clutch 80 to the left, in the direction of the arrow 94 labeled "out" against the resistance of the spring 90 and disengage the dogs 84 from the openings 82.

When the clutch handle 114 is actuated in the clutch engaging direction (the direction of the arrow 162), the control cable 104 is relaxed and the clutch work 98 moves toward the right (FIGURE 1) allowing the spring 90 (FIGURE 3) to bias the dog clutch 80 toward the right, in the direction of the arrow 92 labeled "in," causing the openings 82 to engage with dogs 84 so that the spline connection 164 between the drive shaft 66, dog clutch 80, openings 82 and dogs 84 all effect rotation of wheel 16.

The motor 56 thus establishes driving connection with both the wheels 14 and 16 and supplies the necessary motor power for transporting the vehicle 22. Usually, there is someone also located within the vehicle to steer the vehicle wheels and assist in directing the vehicle while it is being moved.

When the vehicle 22 reaches its destination, the motor is then deactuated by the electric operating switch 148, the clutch is disengaged by pulling the clutch handle 114 and, acting through the cable 104 driving the clutch fork 98 toward the left against the resistance of spring 90 to disengage the openings 82 from dogs 84 and thus severing driving connection between the shaft 66 and wheel 16. The shaft 66 then merely turns within the bushing 86. The spring 90, acting through the drive axial bearing 74, maintains the pressure against the dog clutch 80 to engage or disengage the dogs 84 with the openings 82.

In operation, there are only two persons required to operate the car movement, one in conjunction with the push vehicle 10 and the other located within the car to steer the automobile.

Since there is electrical means for energizing the push vehicle 10, there is no problem of air pollution during operation. Also, the push vehicle 10 takes up very little space and is compact so as to be storable in a convenient location. The battery is usually required to be charged after a period of between about 8 to 36 hours of use but since the push vehicle 10 is normally located in places of vehicle repair, it is a simple matter to effect charging of the battery.

It is thus possible to quickly, efficiently and economically handle substantial numbers of cars with only two individuals, this being in contrast with a number substantially greater than that previously required for pushing and handling immobile vehicles by hand.

Figure 6:
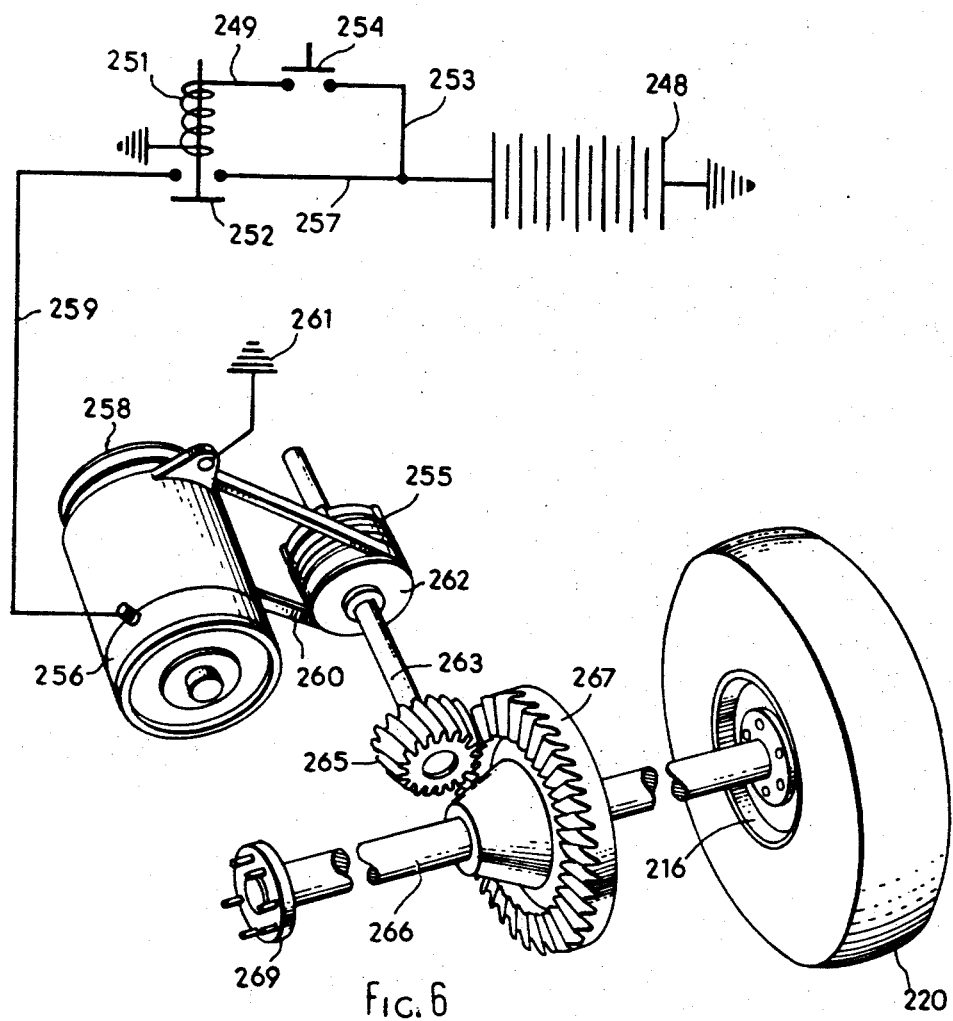

In a still further embodiment of the invention, with reference to FIGURES 5 and 6, push vehicle, designated generally by reference numeral 200 includes a carriage 212 supported on two spaced wheels 214 and 216 having ground-engaging tires 218, 220. The axis of rotation of the wheels, as in the previous embodiment, defines the axis about which the carriage is pivoted by handle 224 to raise a disabled vehicle, the same as in the previous embodiment. When the handle 224 is pushed down, a lift arm 230 having a V-shaped cross section lifting surface 232 raises the car transmitting force through the member 213 to the carrier. Generally, the lifting surface 232 includes a protective surface, which, while in engagement with the bumper of the vehicle will not produce damage thereto. Protection can be in the form of a rubber bumper protector 244.

The lift arm 230 includes a threaded stem 231 which threads an internal threaded opening of the lift arm 230. In this way, the effective length of the lift arm 230 can be varied to suit the particular requirements of the carriage and the vehicle being towed.

The wheels 218, 220 are driven by a battery 248 which is connected by conductor 253 to a solenoid relay switch 254 which in turn is connected through conductor 249 to a solenoid 251 which, when energized, closes the solenoid operated switch 252 thereby connecting battery 248 through conductor 257, closed switch 252 and conductor 259 to motor 256 having a take-off pulley 258 which connects with a second pulley 262 through a V-belt 260.

The pulley 262 drives a shaft 263 having a pinion gear 265 which meshes with a drive gear 267 on drive shaft 266. The shaft 266 connects through a flange 269 and transmission to wheels 214, 216. The described drive connection between the two wheels 214, 216, through standard transmission 271 (FIGURE 5) permits the wheels 214, 216, either to co-rotate or to rotate one faster than the other to improve a maneuverability of the push vehicle for spotting the cars.

In operation, the switch 254 is disposed conveniently to the grip bars 226, 228 and can be readily grasped while closing the switch 254 and thus provide a closed circuit from battery 248 through conductor 257, conductor 253, closed switch 254, conductor 249, the coils of solenoid 251 to ground, thereby energizing the solenoid coil 251, and effecting closing of switch 252.

When switch 252 is closed, there is a circuit which is made from battery 248, conductor 257, closed switch 252, conductor 259 to the motor 256 which is grounded at 261.

When the motor 256 is energized, the pulley 258 is rotated, driving the pulley 262 through belt 260 and drive shaft 263 acting through pinion gear 265 and drive gear 267 rotates the drive shaft 268 and transmission 271 to turn the wheels 214, 216.

The motor 256-pully 262 combination drives the shaft 263 through a clutch 255 which is operated from the handle 224 by handle 215. The operator has an opportunity to control the drive to the wheels 214, 216 by engaging or disengaging the clutch 255 through the handle 215 which is readily accessible at the grip bars 226, 228.

The structure 271 which receives the output of motor 256 is a rear end transmission which functions such that if either of the tires 218, 220 should start to slide or slip, the other tire will become the primary traction tire. Also, the transmission permits relative turning movement between the two tires 218, 220 for close maneuverability by the push vehicle 200.

The operator thus has a combination control both by the clutch handle 215 and by the switch 254 to assist in spotting the vehicle.

The ground-engaging tires 218, 220 then provide the drive force for the vehicle which is operatively connected to the push vehicle 200.

The lift arm 230 can be readily adjusted by means of the threaded stem 231 which can be turned into or out of the opening contained within sleeve 230. In this way, the distance from the ground to the bumper of the vehicle for the respective models and sizes can all be adjusted for the same tow vehicle 200.

When the motor is actuated by the battery 248 as described, the tow vehicle can be readily maneuvered since either wheel can turn relatively to the other because of the differential 271. In this way, the tow vehicle can be powered into any one of its various positions and can be tightly maneuvered because of the tight turning radius obtainable with the tires 218, 220.

It should be understood that once the V-shaped lifting surface 232 is secured to the bumper and the bumper raised by pivoting the lever 224 downwardly in the direction of the arrow 260, the lifting surface becomes interlocked with the bumper but since the surface 232 can rotate relatively to the lift arm 230, and the wheels 218, 220, therefore can be turned in a very tight radius to move the car in the direction and line of path desired.

When the vehicle reaches its spotting point, the motor 256 is deactuated by switch 254 and the circuit from battery 248 to motor 256 is thus broken through the opening of solenoid switch 252. There is readily accessible to the user the means for stopping and starting the motor 256 and the tow vehicle 200 is readily detached from the vehicle by rotating the handle 224 opposite the direction of the arrow 268 (FIGURE 5) and thereby lowering the support surface 232, disengaging it from the bumper of the vehicle.

It is reasonably to be expected that those skilled in the art can make numerous revisions and adaptations of the invention to suit individual design requirements and it is intended that such revisions and adaptations which incorporate the herein disclosed principles, will be included within the scope of the following claims as equivalents of the plurality of embodiments constituting the invention.

I claim:

1. An apparatus for transporting vehicles comprising a transportable carrier member consisting of only two ground engaging wheels with an axle mounted thereon to form an axis about which the carrier member is adapted to pivot, a handle projecting upwardly from said carrier member, power means carried by said carrier member to effect rotation of at least one of said ground support wheels, transmission means operatively connected to said axle and to said power means for transferring positive driving force therebetween, means for energizing said power means, remotely operated switch means for selectively connecting said energizing means to said power means, a lifting arm extending forwardly of said carrier member and forming an angle of less than 90° with respect to the horizontal in the operative position of said apparatus, a portion of said lifting arm being constructed to receive a part of said vehicle to effect lifting force thereon to transfer successively greater quantities of weight onto the ground engaging wheels until the traction of said wheels is sufficient to transport the vehicle in an incompletely lifted position, and means forming a force-transmitting connection between said lifting arm and said carrier member.

2. The apparatus in accordance with claim 1 including mounting means for said lifting arm to provide for vertical adjustment relative to the carrier member and for pivotal movement about a symmetrical axis.

3. The apparatus in accordance with claim 1 wherein the transmission means includes a shaft having a pinion gear driven by said power means, a drive gear in constant mesh with said pinion gear, and said drive gear being connected to said axle.

4. The apparatus in accordance with claim 1 wherein the energizing means is comprised of a battery means and the power means is comprised of an electrical motor.

5. The apparatus in accordance with claim 1 wherein said handle projecting outwardly from said carriage which serves to steer the carriage and having a length effective to provide a lever arm about the axis of said carriage to permit at least partial lifting of the vehicle being transported by said apparatus.

6. The apparatus in accordance with claim 1 wherein the transmission means includes a clutch which is adapted for engagement and disengagement, and an operator controlled clutch actuating means for controllably engaging and disengaging said clutch.

7. The apparatus in accordance with claim 1 wherein the portion adapted to engage with the vehicle is V-shaped in cross section and having a bumper means mounted thereon.

8. The apparatus in accordance with claim 1 having two ground support wheels with an axle therebetween, a friction clutch carried by the axle and adapted to engage one wheel, a dog clutch carried by the axle and adapted to engage the other wheel, and lever means including a fork member for disengaging said dog clutch.

References Cited

UNITED STATES PATENTS

| 1,657,514 | 1/1928 | Miller | 180—19 |
| 1,826,110 | 10/1931 | Wickman | 254—131 |
| 2,408,937 | 10/1946 | Lendermon | 180—19 |
| 2,510,434 | 6/1950 | Toohey | 180—19 |
| 2,714,935 | 8/1955 | Papp | 180—19 |
| 2,725,946 | 12/1955 | Welter | 180—19 |
| 2,955,666 | 10/1960 | Lindley | 180—65 |

FOREIGN PATENTS 475,746  11/1937  Great Britain.

KENNETH H. BETTS, *Primary Examiner.*

U.S. Cl. X.R.

180—14, 65; 254—131